Figure 1:
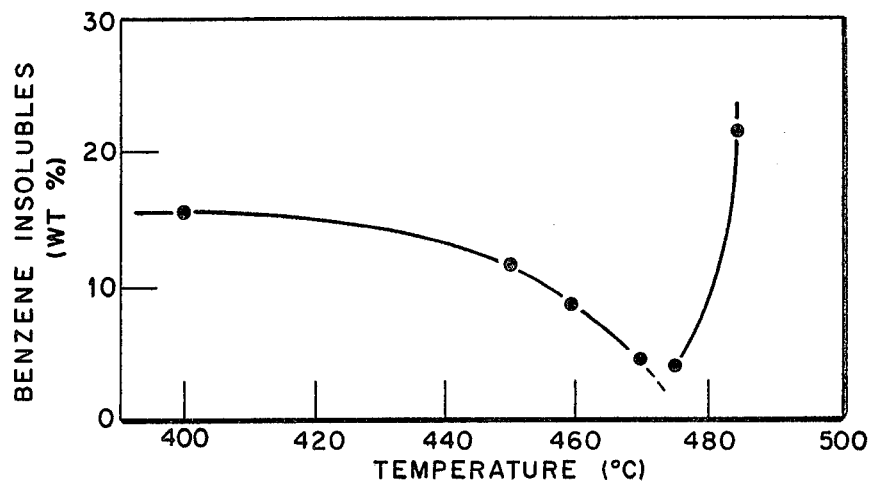

United States Patent [19]

Smith et al.

[11] 4,091,196

[45] May 23, 1978

[54] METHOD FOR REPRODUCIBLY PREPARING A LOW-MELTING HIGH-CARBON YIELD PRECURSOR

[75] Inventors: Wesley E. Smith, Oak Ridge; Bradley Napier, Jr., Powell, both of Tenn.

[73] Assignee: The United States of America as represented by the United States Department of Energy, Washington, D.C.

[21] Appl. No.: 808,590

[22] Filed: Jun. 21, 1977

[51] Int. Cl.$^2$ .................. C08F 2/02; C08F 32/08; C08F 132/00
[52] U.S. Cl. .................. 526/73; 260/37 R; 260/42.43; 526/280
[58] Field of Search .................. 526/73, 280

[56] References Cited

U.S. PATENT DOCUMENTS

| 2,373,714 | 4/1945 | Soday | 526/280 |
| 3,574,653 | 4/1971 | Edstrom et al. | 526/280 |

Primary Examiner—Herbert J. Lilling
Attorney, Agent, or Firm—Dean E. Carlson; Stephen D. Hamel; Earl L. Larcher

[57] ABSTRACT

The present invention is directed to a method for preparing a reproducible synthetic carbon precursor by the autoclave polymerization of indene ($C_9H_8$) at a temperature in the range of 470°–485° C, and at a pressure in the range of about 1000 to about 4300 psi. Volatiles in the resulting liquid indene polymer are removed by vacuum outgassing to form a solid carbon precursor characterized by having a relatively low melting temperature, high-carbon yield, and high reproducibility which provide for the fabrication of carbon and graphite composites having strict requirements for reproducible properties.

3 Claims, 3 Drawing Figures

METHOD FOR REPRODUCIBLY PREPARING A LOW-MELTING HIGH-CARBON YIELD PRECURSOR

The present invention relates generally to a method of preparing a reproducible synthetic carbon precursor and, more particularly, to a method for preparing such a precursor by the autoclave polymerization of indene in a narrow temperature range which yields a solid low-melting thermoplastic polymer having readily reproducible properties and a high-carbon yield. This invention was made in the course of, or under, a contract with the U.S. Energy Research and Development Administration.

Carbonaceous products ranging from amorphous carbon to highly crystalline graphite are well known as structural materials for use in applications where high temperature and corrosive chemical activities are encountered. Amorphous carbon or graphite structures are usually made with an organic binder of a suitable carbon precursor alone or in a mixture with a filler material, such as carbon, coke, decomposible organic or inorganic salts, and fibers to form either a densified or porous product after heating the precursor or the mixture in an inert atmosphere to a temperature suitable to effect the carbonization and/or graphitization of the carbon precursor and the filler materials. A temperature in the range of about 900° to 1000° C. is satisfactory to carbonize the precursor and carbonizable filler materials while a temperature in the range of about 2800° to 3000° C. is satisfactory to convert the carbon to a crystalline graphite structure.

The utilization of such carbonaceous material in many applications has been somewhat restricted due to the lack of a satisfactory high-carbon yield from the precursor, and more importantly, the inability of accurately controlling the reproducibility of the physical properties in the carbonaceous material, particularly, the crystallinity in the synthetic graphite. This lack of providing an accurate control over the reproducibility of the precursor material has been a major stumbling block in the utilization or advancement of carbon technology. Natural carbon precursor materials have different chronologies and are formed from various organic materials under various conditions and do not lend thereselves to reproducibility.

Accordingly, it is the primary objective or aim of the present invention to provide a method for preparing a thermoplastic carbon precursor which can be employed in the manufacture of carbon and graphite structures in a highly reproducible manner. This carbon precursor of the present invention is prepared from the autoclave polymerization of indene at a temperature in the range of 470° to 485° C. and at a pressure in the range of about 1000 to 4300 psi. This specific temperature range provides for the formation of an indene polymer which is particularly characterized by being solid at room temperature after outgassing volatiles and which has a low-melting temperature in the range of about 40° to 105° C. and a carbon yield in the range of about 52 to 66 weight percent. The carbon precursor is further characterized in that when melted at the aforementioned temperature range, its viscosity is such that it is particularly suitable for use in impregnating previously carbonized and graphitized structures so as to provide the desired critical properties of the structure.

For the sake of clarity in the specification and claims, the following terms used herein are described as follows:

(1) Carbon precursor — This term is intended to be descriptive of a precursor which can be converted by heating to a form of carbon selectively variable from amorphous carbon to a highly crystalline graphite.

(2) Indene ($C_9H_8$) — A readily polymerizable hydrocarbon which is liquid at room temperature and is obtained from coal tar distillation or from cracked petroleum. The indene structure incorporates a five-member ring containing both olefinic-type unsaturation and a reactive methylene site.

(3) Truxene — The generic term for molecules formed by the trimerization and subsequent oxidation of indene as represented by the empirical formula $C_{27}H_{18}$.

(4) Alpha truxene — A structural isomer of truxene designated by the formula 10, 15-dihydro-5H-diindeno-[1,2-a:1',2'-C] fluorine.

(5) Beta truxene or isotruxene — A second structural isomer of truxene designated by the formula 10, 15-dihydro-5H-diindeno-[1,2-a:1',2'-C] fluorine.

Other and further objects of the invention will be obvious upon an understanding of the illustrative method about to be described, or will be indicated in the appended claims, and various advantages not referred to herein will occur to one skilled in the art upon employment of the invention in practice.

Graphs relating to indene autoclaved at various temperatures have been shown for the purpose of illustration and description. These graphs are not intended to be exhaustive or limit the invention to the precise heat treatment of the indene at the specific temperature points disclosed in the critial temperature range. The graphs are chosen and described in order to best explain the principles of the invention and their application in practical use to thereby enable others skilled in the art to best utilize the invention in various embodiments and modifications as are best adapted to the particular use contemplated.

Figure 2:
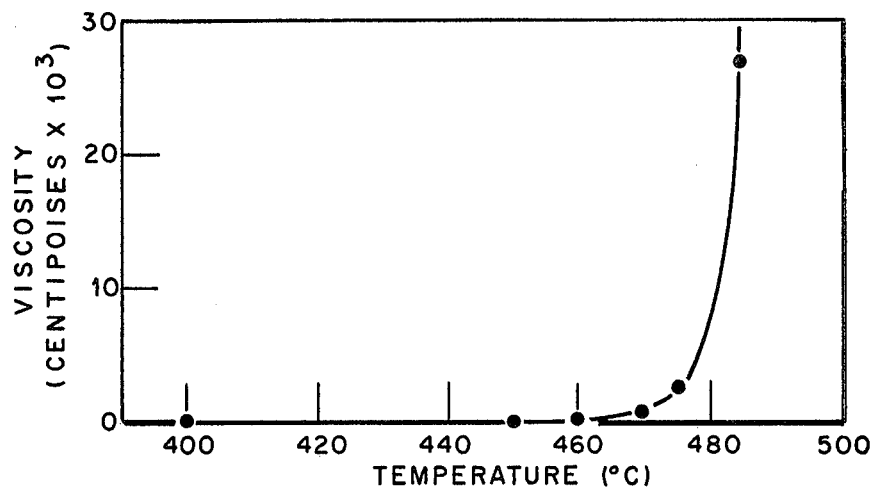
Figure 3:
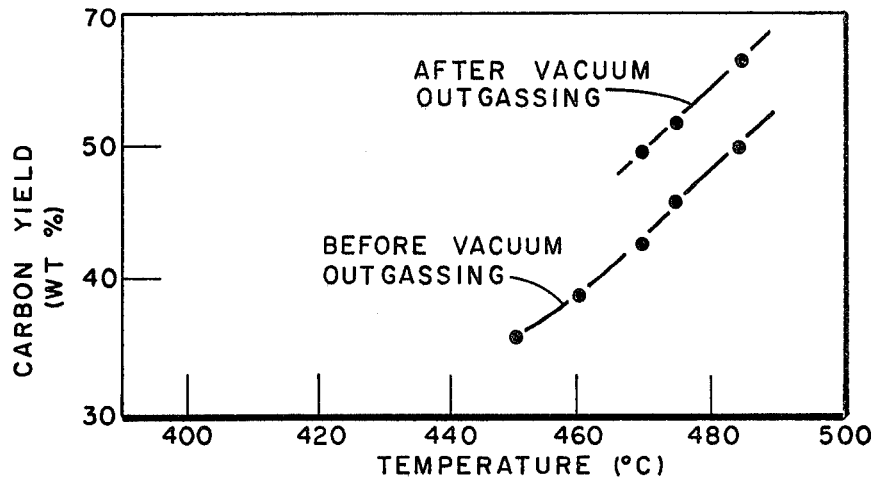

In the accompanying drawing:

FIGS. 1-3 are graphs respectively illustrating the benzene insolubles, viscosity, and carbon yield obtained by the autoclave polymerization of indene at various temperature ranges to illustrate the criticality of the temperature range required to provide the carbon precursor of the present invention.

Described generally, the present invention is directed to a method for preparing a synthetic carbon precursor derived from the autoclaving of indene within a specific temperature range. The carbon precursor of the present invention is characterized by being in solid form at room temperature but possessing a relatively low temperature melting range of about 40° to 105° C. with a viscosity in the range of about 880 to 26,800 centipoises and a carbon yield of about 52 to 66 weight percent. A principal feature of the carbon precursor of the present invention is its reproducibility in that by heat treating each batch of indene at the same temperature and substantially similar pressure, the carbonized or graphitized product will have virtually the same identity.

The carbon precursor of the present invention is prepared by heating liquid indene in an autoclave which is purged with an inert gas, such as argon, and then backfilled to a pressure of about 1000 psi with the inert gas. The temperature inside the autoclave is then increased to a temperature in the range of 470° to 485° C. over a period of about 2 hours. As the temperature inside the autoclave increases to the temperature in the aforementioned range, the pressure inside the vessel increases to a maximum pressure of about 4300 psi due to the generation and thermal expansion of the gases. The autoclave is maintained at temperature for about a 1 to 3 hour period and then the heat to the autoclave is discontinued and the temperature and pressure returned to ambient conditions. The polymerized indene sample is then vacuum outgassed for about 20 to 24 hours at 100° C. to provide a solid pitch-like polymer which possesses a melting point in the range of about 40°–105° C. and a coke yield in the range of about 52–66 weight percent.

The autoclaving of the indene prior to the outgassing step produces a fluid-like pitch retaining about 25 weight percent volatiles which may be removed by the outgassing so as to provide the pitch-like polymer. This vacuum outgassing also provides an increase in the coke yield of the precursor from a value in the range of about 37 to 52 weight percent up to 52 to 66 weight percent depending on the autoclave temperature within said range of 470° to 485° C. The primary volatile removed during the outgassing step is indane ($C_9H_{10}$) which is formed from indene due to the autooxidation reduction reaction.

The synthetic carbon precursor prepared by the autoclave polymerization and outgassing of indene indicates, as shown in FIGS. 1–3, that most of the changes in properties occur after attaining a temperature of 450° C. While pressure and coke yield values increase somewhat linearly with respect to the autoclave heat treatment temperature in the range of about 450°–485° C., abrupt changes in the values of the benzene insolubles (FIG. 1) and the viscosity (FIG. 2) of the polymer occur at a temperature in the range of 470°–485° C. The decrease in the concentration of benzene insolubles in the temperature range of 450°–470° C. is believed to be due to the decomposition of isomeric trimers of indene, mainly alpha truxene and isotruxene, which are formed at lower temperatures in the range of about 200° C. to 250° C. The abrupt increase in benzene insolubles and viscosity above about 475° C corresponds to the formation of high-molecular-weight products and probably signals the initiation of a mesophase formation.

The autoclaving of the indene at a temperature in the range of 470°–485° C. is a critical temperature range in that the quantity of benzene insolubles, the viscosity and the carbon yield changes significantly within this range, especially the viscosity and the benzene insoluble concentration. In order to demonstrate the criticality of this temperature range, six samples of indene were autoclaved at temperatures ranging from 400°–485° C. as best shown in FIGS. 1–3 and the table below setting forth the values used for plotting the curves shown in the drawing.

PROPERTIES OF INDENE POLYMERS PREPARED BY AUTOCLAVE TREATMENT

| Sample No. | Autoclave Temperature (° C) | Autoclave Pressure Initial/Maximum PSI | Viscosity Centipoise | Product Properties ||| Product Properties After Outgassing at 100° C |||
| | | | | Benzene Insolubles (wt.%) | Isotruxene Content In Benzene Insolubles (wt.%) | Carbon Yield (wt.%) | Weight Loss (wt.%) | Melting Range (° C) | Carbon Yield (wt.%) |
|---|---|---|---|---|---|---|---|---|---|
| 20 | 400 | 1000–1800 | 50 | 16 | 45 | — | — | — | — |
| 21 | 450 | 1500–2900 | 80 | 12 | 10 | 23 | — | — | — |
| 27 | 460 | 1500–3700 | 320 | 10 | 9 | 30 | — | — | — |
| 28-B | 470 | 1000–3400 | 880 | 5 | 9 | 37 | 25 | 40–70 | 52 |
| 44 | 475 | 1000–4300 | 2,750 | 4 | — | 44 | 24 | 58–80 | 56 |
| 45 | 485 | 1000–4300 | 26,800 | 21 | — | 52 | 25 | 75–105 | 66 |

As illustrated by the drawing (FIG. 2) and the table, the viscosity of the autoclaved carbon precursor was quite low up to about 470° C. whereas at 475°–485° C, the viscosity increased rapidly. Conversely, the benzene insolubles at 470° C decreased to a small factor due to the decomposition of insoluble truxene polymers and prior to the onset of mesophase formation. The retention of the viscosity in the low temperature melting polymer is particularly advantageous for reproducibility when the product of the carbon precursor is used as an impregnant in the formation of graphite structures. Further, the coke yield of the carbon precursor after vacuum outgassing at 100° C. for about 24 hours is considerably higher than would be obtainable from outgassing the polymerized indene obtained at temperatures less than 470° C. in that the weight loss of the precursor is considerably greater at these lower temperatures due to the increased concentration of the volatiles. At a temperature of about 485° C., the properties of the carbon precursor is such that any higher temperature treatment would result in meso-phase formation which would prohibit the indene polymer from being a satisfactory precursor due to significant increases in the melting temperature, the viscosity, and the benzene insolubles content. The concentration of benzene insolubles in the carbon precursor were determined by digesting 20-gram samples in 200 cubic centimeters of benzene for 2 hours. These insolubles were then collected by filtration, washed with a 100 cubic centimeters of benzene and allowed to dry at 25° C. for 16 hours. The isotruxene content noted in the benzene insoluble fractions were determined by using ultraviolet spectroscopy.

FIG. 1 shows the weight percent of the benzene insolubles decreases to lowest values at approximately 475° C. but that these values abruptly increase when the autoclaving temperature is above 485° C. so as to render the use of higher temperatures undesirable for the formation of the carbon precursor. Also note in FIG. 2 that the polymer viscosity remains rather low up to an autoclaving temperature of 475° C. but abruptly increases above this temperature so as to render the carbon precursor impractical for many applications if heat treated at a temperature above about 485° C. The graph in FIG. 3 shows that the carbon yield increases somewhat linearly from about 450° to 485° C. with the best carbon yields being obtained after the vacuum outgassing step. Indene autoclaved at temperatures less than 470° C. contains a relatively large concentration of volatiles and the removal of these volatiles to provide a solid precursor results in a considerable loss of materials so as to significantly detract from the efficiency of the operation. Further, a high concentration of benzene insolubles and relatively low coke yields are present in indene autoclaved at temperatures less than 470° C.

The reproducibility of the microstructure of the graphite produced by using the carbon precursor of the present invention was verified by crystallographic data which provided an average interlayer spacing ($d_{002}$) of 3.361 A and an average crystallite size ($L_c$) of 700 A. A g-factor of 0.93 was calculated for the graphite which denotes a highly graphite carbon. The g-factor employed in this measurement provides an extent of crystallinity of the graphite. This g-factor represents the percentage of carbon converted to graphite as determined by the formula $d_{002} = (g) 3.354 + (1-g) 3.44$. The term $d_{002}$ is the interlayer spacing of the graphite crystals along the 002 plane while the numbers 3.44 and 3.354 are measurements in angstroms relating to the interlayer spacing of the amorphous carbon and carbon graphite, respectively. These numbers characterize forms of carbon heated to temperatures as high as 3000° C. with a g-factor value of one being representative of complete conversion of the carbon to graphite. Hence, the average g-factor of about 0.93 shows that the subject precursor is particularly suitable for the formation of graphite structures.

It will be seen that by practicing the method of the present invention a carbon precursor for use in relatively sophisticated applications wherein stringent control over process variables and raw materials, such as the carbon precursor, may be reproducibly achieved.

What is claimed is:

1. A method for preparing a thermoplastic carbon precursor comprising the steps of confining indene in an autoclave containing an inert atmosphere, heating the indene to a tempertaure in the range of 470°–485° C. at a pressure in the range of about 1000 to 4300 psi for a duration sufficient to convert the indene to a liquid polymer, reducing the temperature and pressure to ambient conditions, and thereafter vacuum outgassing volatiles from the liquid polymer to provide a solid polymer having a melting temperature in the range of about 40°–105° C., a viscosity in the range of about 880–26,800 centipoises, and a carbon yield in the range of about 52–66 weight percent.

2. The method according to claim 1, wherein said duration sufficient to convert the indene to a liquid polymer is in the range of 1 to 3 hours, and wherein the outgassing step is achieved at a temperature of 100° C. for a duration of 20 to 24 hours.

3. A thermoplastic carbonizable material comprising polymerized indene derived from heating indene in an inert atmosphere at a temperature in the range of 470°–485° C. and at a pressure in the range of about 1000 to 4300 psi and outgassing the resulting liquid polymer for converting the indene to a solid thermoplastic polymer, said polymer being further characterized by possessing a melting temperature in the range of 40° to 105° C. and a carbon yield in the range of about 52 to 66 weight percent.

* * * * *